(12) United States Patent
Tokura et al.

(10) Patent No.: US 11,714,650 B2
(45) Date of Patent: Aug. 1, 2023

(54) NON-TRANSITORY COMPUTER-READABLE MEDIUM, ANALYSIS DEVICE, AND ANALYSIS METHOD

(71) Applicant: FUJITSU LIMITED, Kawasaki (JP)

(72) Inventors: Hiroki Tokura, Yokohama (JP); Masato Nakagawa, Yokohama (JP); Tomotake Nakamura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/709,486

(22) Filed: Mar. 31, 2022

(65) Prior Publication Data

US 2023/0040382 A1    Feb. 9, 2023

(30) Foreign Application Priority Data

Jul. 27, 2021    (JP) ................................. 2021-122310

(51) Int. Cl.
*G06F 9/30* (2018.01)
*G06F 9/32* (2018.01)
*G06F 11/34* (2006.01)
*G06F 11/36* (2006.01)

(52) U.S. Cl.
CPC ...... *G06F 9/30152* (2013.01); *G06F 9/30043* (2013.01); *G06F 9/30065* (2013.01); *G06F 9/324* (2013.01); *G06F 11/3471* (2013.01); *G06F 11/3604* (2013.01)

(58) Field of Classification Search
None
See application file for complete search history.

(56) References Cited

U.S. PATENT DOCUMENTS

| | | | | |
|---|---|---|---|---|
| 8,065,665 B1 * | 11/2011 | Kosche | ................... | G06F 8/443 717/154 |
| 2005/0198466 A1 * | 9/2005 | Estlick | ................ | G06F 12/1027 711/207 |
| 2008/0222382 A1 * | 9/2008 | Snyder | ................ | G06F 11/3466 711/200 |

(Continued)

FOREIGN PATENT DOCUMENTS

| | | |
|---|---|---|
| JP | 2011-118901 A | 6/2011 |
| JP | 2011-204204 A | 10/2011 |
| JP | 2014-182478 A | 9/2014 |

*Primary Examiner* — Isaac Tuku Tecklu
(74) *Attorney, Agent, or Firm* — Fujitsu Patent Center

(57) ABSTRACT

The present disclosure relates to a non-transitory computer-readable recording medium storing an analysis program that causes a computer to execute a process. The process includes sampling an instruction address of one of instructions included in a program during execution of the program, identifying a first function that includes the sampled instruction address in an address range, rewriting mark information associated with the identified first function, identifying first information corresponding to the instruction address of the first function among a plurality of first information based on the rewritten mark information, identifying second information corresponding to the instruction address of the first function among a plurality of second information based on the rewritten mark information, storing the first information and the second information in a memory, and analyzing performance of the program based on the first information and the second information stored in the memory.

7 Claims, 16 Drawing Sheets

(56) References Cited

U.S. PATENT DOCUMENTS

| | | | |
|---|---|---|---|
| 2011/0016289 A1* | 1/2011 | Ableidinger | G06F 11/3471 |
| | | | 714/45 |
| 2011/0131561 A1* | 6/2011 | Adams, III | G06F 8/4434 |
| | | | 717/159 |
| 2014/0282435 A1* | 9/2014 | Fukuda | G06F 11/3419 |
| | | | 717/131 |
| 2016/0179650 A1* | 6/2016 | Yasin | G06F 11/3466 |
| | | | 714/47.1 |
| 2019/0102153 A1* | 4/2019 | Tomita | G06F 11/3466 |
| 2020/0249925 A1* | 8/2020 | Wang | G06F 9/45512 |
| 2021/0081296 A1* | 3/2021 | Cockcroft | G06F 9/4812 |

* cited by examiner

FIG. 3

<FUNCTION INFORMATION>

| FUNCTION NAME | Hoge |
|---|---|
| START INSTRUCTION ADDRESS OF FUNCTION | 0x02A |
| END INSTRUCTION ADDRESS OF FUNCTION | 0x04C |

<DEBUG INFORMATION>

| LINE NUMBER | 15TH LINE |
|---|---|

| LINE NUMBER | 12TH LINE |
|---|---|

| LINE NUMBER | 11TH LINE |
|---|---|
| START INSTRUCTION ADDRESS OF LINE | 0x02C |
| END INSTRUCTION ADDRESS OF LINE | 0x03A |
| SOURCE FILE NAME | main.c |

43a

| START LINE | 13TH LINE |
|---|---|
| END LINE | 16TH LINE |

| START LINE | 11TH LINE |
|---|---|
| END LINE | 18TH LINE |
| START INSTRUCTION ADDRESS OF LINE | 0x02A |
| END INSTRUCTION ADDRESS OF LINE | 0x040 |

<PERFORMANCE INFORMATION>

| NUMBER OF SAMPLINGS | EXECUTION TIME (s) (APPROXIMATE VALUE) | START LINE | END LINE | FUNCTION NAME |
|---|---|---|---|---|
| 100 | 100 | 17 | 41 | main |
| 20 | 20 | 59 | 66 | hoge |
| 17 | 17 | - | - | system_func |
| 2 | 2 | 3 | 5 | hoge2 |

| NUMBER OF SAMPLINGS | EXECUTION TIME (s) (APPROXIMATE VALUE) | LOOP START LINE | LOOP END LINE | FUNCTION NAME |
|---|---|---|---|---|
| 72 | 72 | 30 | 37 | main |
| 4 | 4 | 21 | 23 | main |
| 3 | 3 | 4 | 5 | hoge2 |
| 2 | 2 | 64 | 65 | hoge2 |

| NUMBER OF SAMPLINGS | EXECUTION TIME (s) (APPROXIMATE VALUE) | LINE NUMBER | FUNCTION NAME |
|---|---|---|---|
| 36 | 36 | 33 | main |
| 10 | 10 | 36 | main |
| 8 | 8 | 62 | hoge |

| FUNCTION | INSTRUCTION ADDRESS | Mark |
|---|---|---|
| hoge1 (FUNCTION WHOSE INSTRUCTION IS SAMPLED) | 0x400001 | 1 |
| hoge2 (FUNCTION WHICH IS CALLER OF FUNCTION HOGE1) | 0x400101 | 1 |
| main1 (FUNCTION WHICH IS CALLER OF FUNCTION HOGE2) | 0x400201 | 1 |
| hoge3 (FUNCTION WHOSE INSTRUCTION IS NOT SAMPLED) | 0x400301 | 0 |
| main2 (FUNCTION WHICH IS CALLER OF FUNCTION HOGE3) | 0x400401 | 0 |

FIG. 15

| <ADDRESS RANGE DB> | | |
|---|---|---|
| RANGE A | RANGE B | RANGE C |
| 0x2 ~ 0x3 | 0x6 ~ 0x7 | 0xa ~ 0xd |

72

NON-TRANSITORY COMPUTER-READABLE MEDIUM, ANALYSIS DEVICE, AND ANALYSIS METHOD

CROSS-REFERENCE TO RELATED APPLICATION

This application is based upon and claims the benefit of priority of the prior Japanese Patent Application No. 2021-122310 filed on Jul. 27, 2021, the entire contents of which are incorporated herein by reference.

FIELD

A certain aspect of the embodiments is related to a non-transitory computer-readable medium, an analysis device, and an analysis method.

BACKGROUND

There is a profiler as an analysis program that analyzes the performance of an application program. The profiler is a program that outputs performance such as an execution time for each function included in the application program. A developer can figure out which parts of the application program need to be improved in order to reduce the execution time of the application program, based on the output of the profiler.

However, as the scale of the application program increases, the memory may become insufficient at the time of the execution of the profiler, and the execution of the profiler may fail. Note that the technique related to the present disclosure is disclosed in Japanese Laid-open Patent Publications No. 2011-204204, No. 2011-118901 and No. 2014-182478, and U.S. Laid-open Patent Publication No. 2020/0249925.

SUMMARY

According to an aspect of the present disclosure, there is provided a non-transitory computer-readable recording medium storing an analysis program that causes a computer to execute a process, the process including: sampling an instruction address of one of a plurality of instructions included in a program during execution of the program; identifying a first function that includes the sampled instruction address in an address range; rewriting mark information associated with the identified first function; identifying first information corresponding to the instruction address of the first function among a plurality of pieces of first information based on the rewritten mark information, the first information being information in which a position and an address range in a source file of the program are associated with each other for each position; identifying second information corresponding to the instruction address of the first function among a plurality of pieces of second information based on the rewritten mark information, the second information being information in which a start line, an end line, a start instruction address, and an end instruction address of loop processing in the source file of the program are associated with each other; storing the first information and the second information in a memory; and analyzing performance of the program based on the first information and the second information stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating function information;

FIG. 4 is a schematic diagram illustrating debug information;

FIG. 6 is a schematic diagram illustrating performance information;

FIG. 7A is a schematic diagram illustrating the performance information of a loop processing;

FIG. 7B is a schematic diagram illustrating the performance information of a line;

FIG. 10 is a schematic diagram illustrating a name, an instruction address, and a mark of each function;

FIG. 15 is a schematic diagram illustrating an address range DB; and

DESCRIPTION OF EMBODIMENTS

It is an object of the present disclosure to suppress a memory usage at the time of analyzing a program.

Prior to the description of the present embodiment, matters studied by an inventor will be described.

When the profiler analyzes the performance of an application program, the profiler first stores function information and debug information in a memory. The function information is information in which a function name and an address range of a function are associated with each other. Further, the debug information is information in which a line number of a source code of the application program is associated with the address range of the line number.

Next, the profiler executes the application program. At this time, the profiler periodically executes interruption to the application program and obtains the instruction address at the time of the interruption. This operation is called sampling.

When the execution of the application program is complete, the profiler identifies the function name of the instruction address obtained by sampling based on the function information. By identifying the function name for each of the multiple sampling in this way, the profiler can estimate the execution time of the function. For example, it is assumed that the sampling is done at intervals of one second. In this case, when a certain function is sampled 8 times, the profiler estimates that the execution time of that function is 8 seconds.

According to the operation of such a profiler, the function information and the debug information are stored in memory in advance prior to the execution of the application program. However, with the technological innovation, the number of functions described in the application program tends to increase, and storing the function information and the debug information in the memory significantly increases the memory usage.

In particular, in HPC such as supercomputers, an amount of memory per node tends to decrease year by year. Table 1 is a table illustrating the respective performance of supercomputers "K computer" and "Fugaku".

TABLE 1

| COMPUTER NAME | NUMBER OF CORES PER NODE | AMOUNT OF MEMORY PER NODE [GB] | AMOUNT OF MEMORY PER NODE/NUMBER OF CORES PER NODE |
|---|---|---|---|
| K COMPUTER | 8 | 16 | 2 |
| FUGAKU | 48 | 32 | 0.67 |

As illustrated in Table 1, the number of cores per node and the amount of memory per node are larger for "Fugaku" than for "K computer". However, the amount of memory per node with respect to the number of cores per node is smaller for "Fugaku" than for "K computer".

When the amount of memory per node with respect to the number of cores per node becomes small in this way, the function information and the debug information cannot be stored in memory, and the profiler cannot be executed.

Hereinafter, the present embodiment that can suppress the memory usage will be described.

(Present Embodiment)

Figure 1:
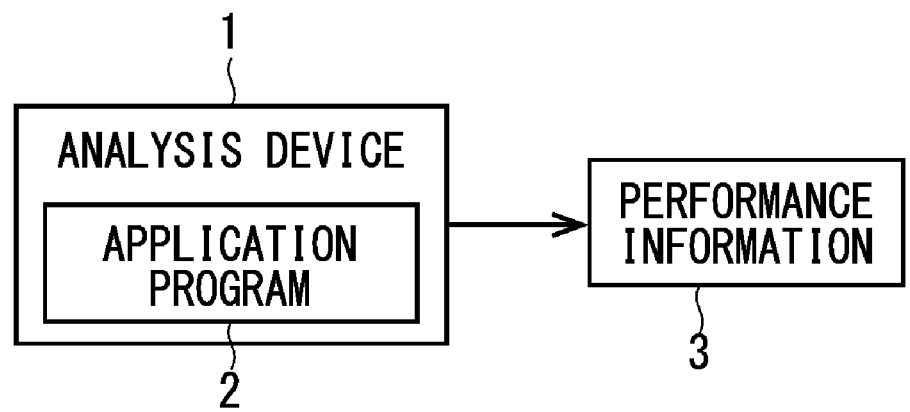
FIG. 1 is a schematic diagram illustrating a process performed by an analysis device according to the present embodiment.

FIG. 1 is a schematic diagram illustrating a process performed by an analysis device according to the present embodiment. An analysis device 1 is a computer such as a supercomputer. The analysis device 1 executes an application program 2 to output performance information 3 indicating the performance of the application program 2. As an example, the performance information 3 includes an execution time of each function included in the application program 2.

Figure 2:
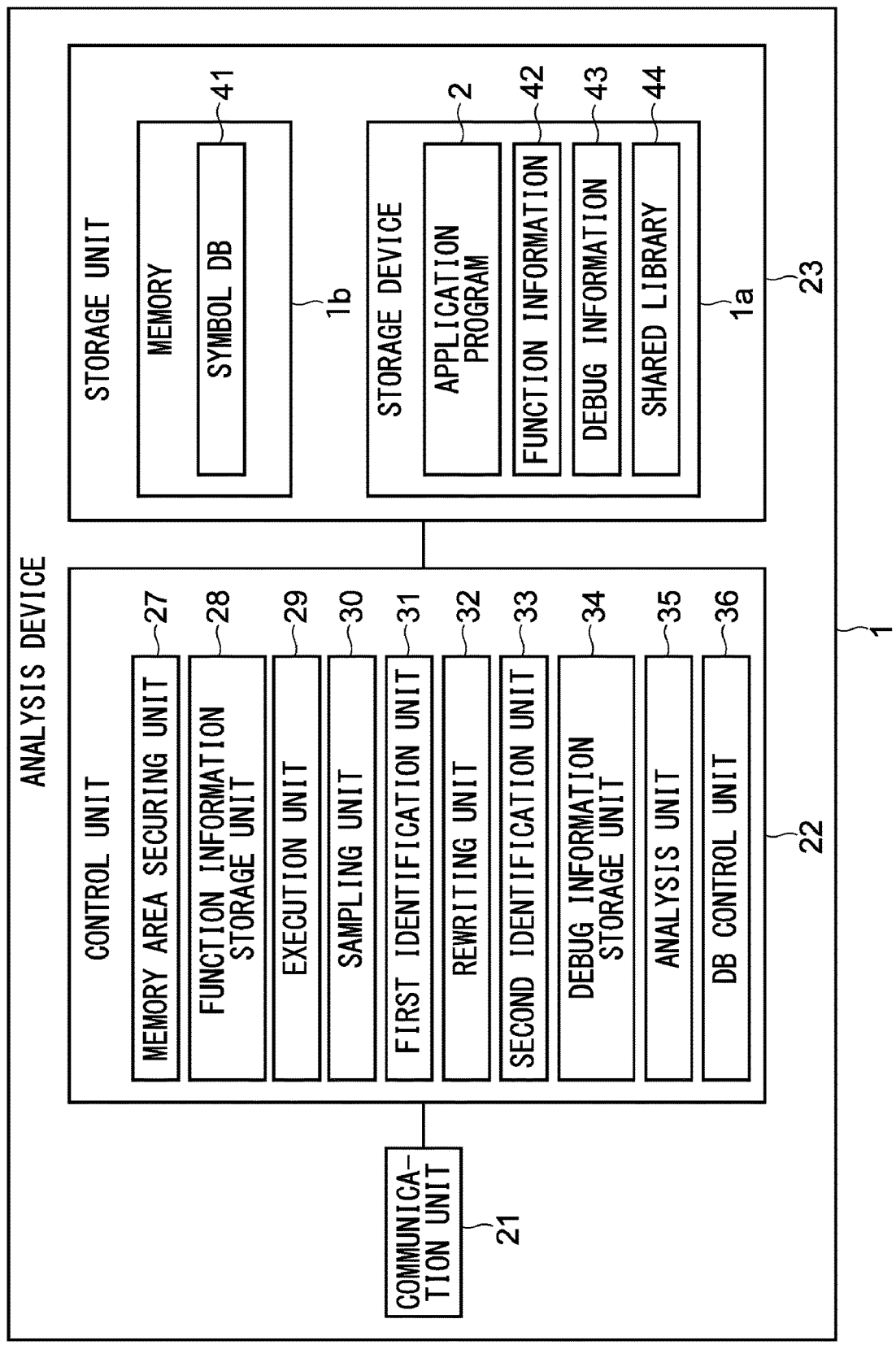
FIG. 2 is a functional configuration diagram illustrating the analysis device according to the present embodiment.

FIG. 2 is a functional configuration diagram illustrating the analysis device 1. As illustrated in FIG. 2, the analysis device 1 includes a communication unit 21, a control unit 22, and a storage unit 23.

The communication unit 21 is a processing unit for connecting the analysis device 1 to a network such as an Internet or LAN (Local Area Network).

The storage unit 23 is a processing unit realized by a storage device 1a such as HDD (Hard Disk Drive) and a memory 1b such as DRAM (Dynamic Random Access Memory).

The storage device 1a stores the application program 2, function information 42, debug information 43, and shared library 44. The application program 2 is a binary program obtained by compiling the source file written by the developer.

FIG. 3 is a schematic diagram illustrating the function information 42. As illustrated in FIG. 3, the function information 42 is information in which the function name, a start instruction address of the function, and an end instruction address of the function included in the application program 2 are associated with each other. The start instruction address is a first instruction address among a plurality of instructions to realize the function. The end instruction address is a last instruction address among the plurality of instructions to realize the function. Hereinafter, a range from the start instruction address to the end instruction address is referred to as the address range. The same applies to the address range in the debug information 43 described below. The function information 42 is generated by a compiler when the compiler compiles the source file of the application program 2.

FIG. 4 is a schematic diagram illustrating the debug information 43. As illustrated in FIG. 4, the debug information 43 includes a plurality of pieces of line information 43a and a plurality of pieces of loop information 43b.

The line information 43a is an example of the first information, and is information in which a line number that indicates a position in the source file of the application program 2 and the address range are associated with each other for each line number. The address range is a range of addresses starting from the start instruction address of a line and ending with the end instruction address of the line. The start instruction address of the line is the instruction address of a first instruction among the plurality of instructions corresponding to the line. The end instruction address of the line is the instruction address of a last instruction among the plurality of instructions corresponding to the line.

The loop information 43b is an example of the second information, and is information in which a start line, an end line, and the address range of the loop processing included in the application program 2 are associated with each other. The address range is the range of addresses starting from the start instruction address of the line and ending with the end instruction address of the line. The start instruction address is the instruction address of a first instruction among the plurality of instructions that realize the loop processing. The end instruction address is the instruction address of a last instruction among the plurality of instructions that realize the loop processing. The debug information 43 is generated by the compiler when the compiler compiles the source file of the application program 2.

Referring again to FIG. 2, the shared library 44 is a binary file of functions provided by an operating system (OS) of the analysis device 1.

Figure 5:
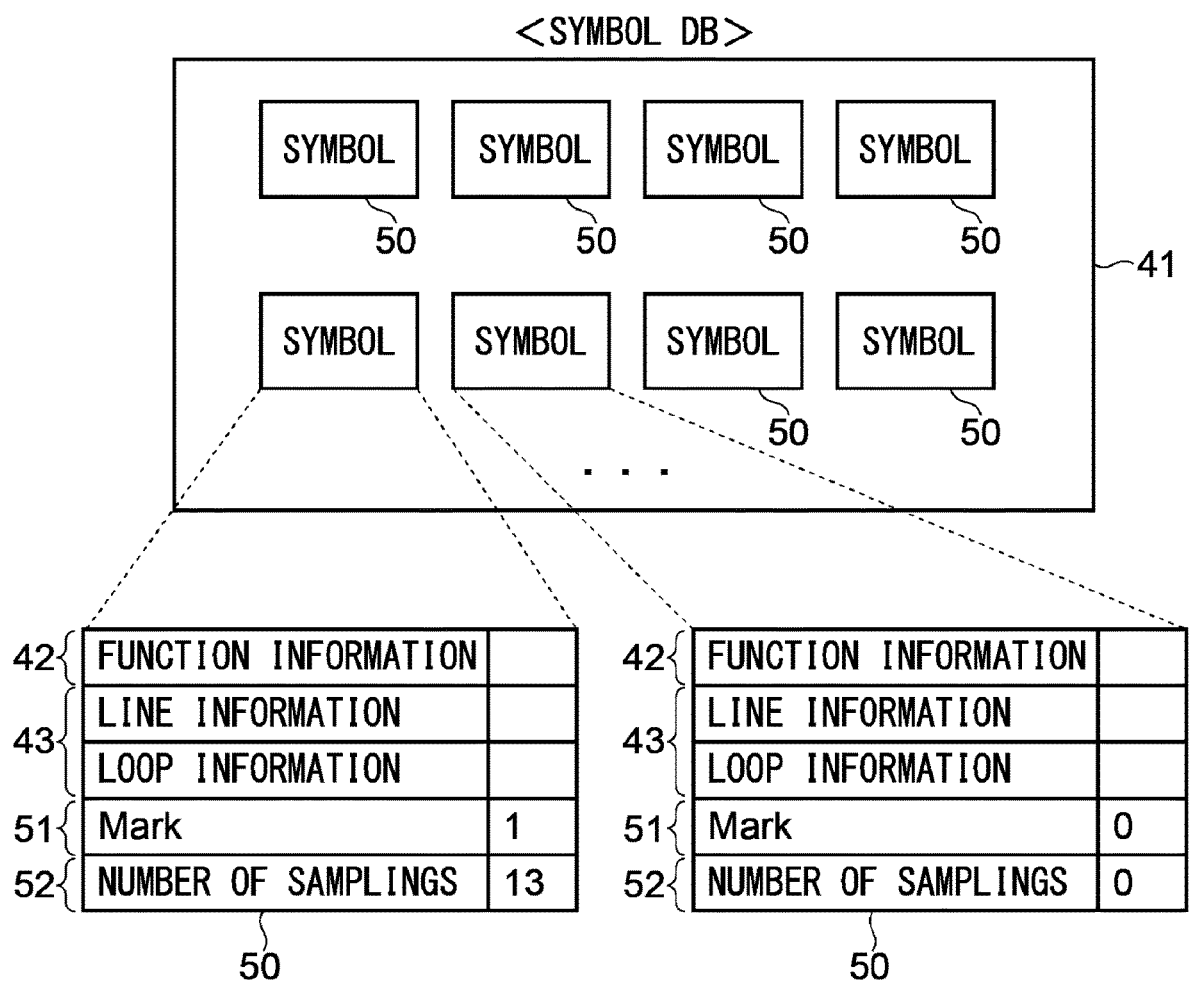
FIG. 5 is a schematic diagram illustrating a symbol DB.

The memory 1b stores a symbol DB 41. FIG. 5 is a schematic diagram illustrating the symbol DB 41. As illustrated in FIG. 5, the symbol DB 41 is a database that stores a plurality of symbols 50.

Each symbol 50 is a C language structure in which the function information 42, the debug information 43, a mark 51, and a number of samplings 52 are associated with each other. A C++ structure may be used in place of the C language structure. The mark 51 is a flag that is set to "1" if the instruction address of the instruction sampled during the execution of the application program 2 belongs to the address range in the function information 42, and is set to "0" otherwise. The mark 51 is an example of mark information. The number of samplings 52 is an integer indicating the number of times the instructions corresponding to the function information 42 are sampled during a period from the start of the execution of the application program 2 to the end of execution thereof.

Referring again to FIG. 2, the control unit 22 is a processing unit that controls each part of the analysis device 1. As an example, the control unit 22 has a memory area securing unit 27, a function information storage unit 28, an execution unit 29, a sampling unit 30, a first identification unit 31, a rewriting unit 32, a second identification unit 33, a debug information storage unit 34, an analysis unit 35, and a DB control unit 36.

The memory area securing unit 27 is a processing unit that secures an area for storing the function information 42 in the symbol 50 into the memory 1b. The function information storage unit 28 is a processing unit that stores the function information 42 into the area secured by the memory area securing unit 27.

The execution unit 29 is a processing unit that executes the application program 2. The sampling unit 30 is a processing unit that periodically samples the instruction address of each instruction included in the application program 2 during the execution of the application program 2.

The first identification unit 31 is a processing unit that identifies a function including the sampled instruction address in the address range. As an example, the first identification unit 31 identifies the symbol 50 corresponding to the sampled instruction address among the plurality of symbols 50 by searching the symbol DB 41. For example, the symbol 50 having the function information 42 including the sampled instruction address in the address range becomes the function information 42 corresponding to the instruction address. Then, the first identification unit 31 identifies the function including the sampled instruction address in the address range by identifying the function name included in the function information 42 of the identified symbol 50.

The rewriting unit 32 is a processing unit that rewrites the mark 51 in the symbol 50 corresponding to the function identified by the first identification unit 31 from "0" to "1".

The second identification unit 33 is a processing unit that identifies the line information 43a whose address range is included in the address range of the function identified by the first identification unit 31, among the plurality of pieces of line information 43a included in the debug information 43.

As an example, the second identification unit 33 identifies the symbol 50 whose mark 51 is "1" by searching the symbol DB 41. Next, the second identification unit 33 identifies the address range of the function information 42 of the symbol 50 whose mark 51 is "1". Then, the second identification unit 33 identifies the line information 43a having an address range included in the address range identified in this way.

The address range of the function identified by the first identification unit 31 may include the respective address ranges of the plural of pieces of line information 43a. In this case, the second identification unit 33 identifies the plurality of pieces of line information 43a.

The second identification unit 33 may identify the loop information 43b whose address range is included in the address range of the function identified by the first identification unit 31, among the plurality of pieces of loop information 43b included in the debug information 43.

The debug information storage unit 34 is a processing unit that stores only the line information 43a identified by the second identification unit 33 into the symbol 50 in the memory 1b, among the plurality of pieces of line information 43a included in the debug information 43.

The second identification unit 33 may identify the loop information 43b as described above. In this case, the debug information storage unit 34 may store only the loop information 43b identified by the second identification unit 33 into the symbol 50 of the memory 1b, among the plurality of pieces of loop information 43b included in the debug information 43.

The analysis unit 35 is a processing unit that analyzes the performance of the application program 2 during execution based on the line information 43a stored in the symbol 50 of the memory 1b, and outputs the performance information 3 indicating the analyzed performance.

FIG. 6 is a schematic diagram illustrating the performance information 3. As illustrated in FIG. 6, in the performance information 3, the number of samplings, the execution time, the start line, the end line and the function name are associated with each other.

The number of samplings is a number of samplings in the symbols 50. The execution time is an approximate value of the execution time of the function, and is obtained from a sampling interval and the number of samplings. For example, if the sampling interval is 1 second and the number of samplings is 100, the analysis unit 35 calculates 100 seconds (=1 second×100) as the execution time.

The start line and the end line are the line numbers of the line information 43a identified by the second identification unit 33. If there are the plurality of pieces of line information 43a identified by the second identification unit 33, a minimum value of the line numbers in the plurality of pieces of line information 43a becomes the start line and a maximum value thereof becomes the end line.

As illustrated in FIGS. 7A and 7B, the analysis unit 35 may output the performance information 3a of the loop processing and the performance information 3b of the line.

FIG. 7A is a schematic diagram illustrating the performance information 3a of the loop processing. As illustrated in FIG. 7A, in the performance information 3a, the number of samplings, the execution time, the loop start line, the loop end line and the function name are associated with each other.

The number of samplings is the number of times the instructions included in the loop processing are sampled between the start and the end of the execution of the application program 2. The execution time is an approximate value of the time required for the loop processing, and is calculated by multiplying the number of samplings by the sampling interval.

The loop start line and the loop end line are the line numbers where the loop processing starts and ends in the source file, respectively. The function name is a name of the function in which the loop processing is described.

FIG. 7B is a schematic diagram illustrating the performance information 3b of the line. As illustrated in FIG. 7B, in the performance information 3b, the number of samplings, the execution time, the line number and the function name are associated with each other.

The line number is the number of times the instructions included in a certain line are sampled between the start and the end of the execution of the application program 2. The execution time is an approximate value of the time required to execute the line, and is calculated by multiplying the number of samplings by the sampling interval. The line number is a number of the line for which performance is analyzed. The function name is a name of the function including the line.

Next, an analysis method according to the present embodiment will be described.

Figure 8:
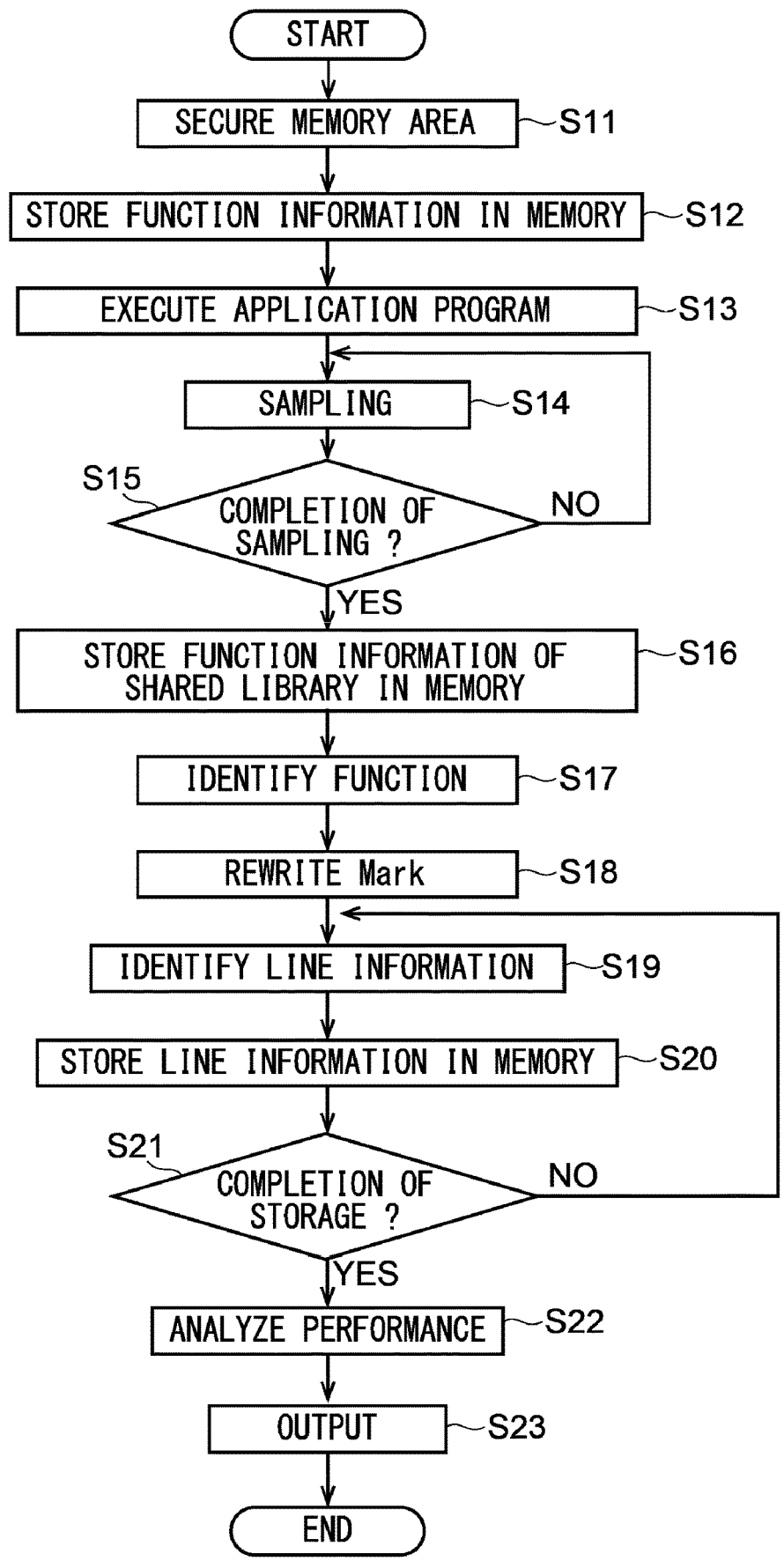
FIG. 8 is a flowchart illustrating an analysis method according to the present embodiment.

FIG. 8 is a flowchart illustrating the analysis method according to the present embodiment.

First, the memory area securing unit 27 secures an area for storing the function information 42 in the symbol 50 in the memory 1b (step S11).

Next, the function information storage unit 28 stores the function information 42 in the area secured in step S11 (step S12).

Next, the execution unit 29 executes the application program 2 (step S13). Then, the sampling unit 30 periodically samples the instruction address of the instruction included in the application program 2 (step S14).

Subsequently, the sampling unit 30 determines whether the sampling of the instruction address is completed (step S15). As an example, the sampling unit 30 determines that the sampling is completed when the execution of the application program 2 is completed, and determines that the sampling is not completed when the application program 2 is executing.

Here, if the determination of step S15 is NO, the procedure returns to step S14.

On the other hand, if the determination of step S15 is YES, the procedure proceeds to step S16. In step S16, the function information storage unit 28 stores the function information of the shared library 44 in the memory 1b. If there is no need to analyze the performance of the function in the shared library 44, step S16 may be omitted.

Next, the first identification unit 31 identifies the function that includes the sampled instruction address in the address range (step S17).

Next, the rewriting unit 32 rewrites the mark 51 in the symbol 50 corresponding to the function identified in step S17 from "0" to "1" (step S18).

Subsequently, the second identification unit 33 identifies the line information 43a whose address range is included in the address range of the function identified by the first identification unit 31, among the plurality of pieces of line information 43a included in the debug information 43 (step S19). For example, the second identification unit 33 searches the symbol DB 41 to identify the symbol 50 whose mark 51 is "1", and identifies the line information 43a having the address range included in the address range of the function information 42 of the symbol 50. Note that the second identification unit 33 may identify the loop information 43b whose address range is included in the address range of the function identified by the first identification unit 31, among the plurality of pieces of loop information 43b included in the debug information 43. In this case, the second identification unit 33 searches the symbol DB 41 to identify the symbol 50 whose mark 51 is "1", and identifies the loop information 43b having the address range included in the address range of the function information 42 of the symbol 50.

Next, the debug information storage unit 34 stores in the memory 1b only the line information 43a identified in step S19 among the plurality of pieces of line information 43a (step S20). The debug information storage unit 34 does not store the line information 43a not identified in step S19 in the memory 1b, but leaves it in the storage device 1a. Further, the debug information storage unit 34 may store only the loop information 43b identified in step S19 in the memory 1b among the plurality of pieces of loop information 43b. In this case, the debug information storage unit 34 does not store the loop information 43b not identified in step S19 in the memory 1b, but leaves it in the storage device 1a.

Next, the debug information storage unit 34 determines whether the storage of the line information 43a in the memory 1b is completed (step S21). For example, the debug information storage unit 34 determines that the storage of the line information 43a is completed when the search for all the symbols 50 in the symbol DB 41 is completed, and determines that the storage of the line information 43a is not completed otherwise.

If the determination of step S21 is NO, the procedure returns to step S19. On the other hand, if the determination of step S21 is YES, the procedure proceeds to step S22.

In step S22, the analysis unit 35 analyzes the performance of the application program 2 during execution based on the line information 43a stored in the symbol 50 of the memory 1b. The analysis unit 35 may analyze the performance of the application program 2 during execution based on the loop information 43b stored in the symbol 50 of the memory 1b. After that, the analysis unit 35 outputs the performance information 3 indicating the analyzed performance (step S23), and the process is completed.

According to the embodiment described above, in step S20, the debug information storage unit 34 stores in the memory 1b only the line information 43a identified in step S19, among the plurality of pieces of line information 43a included in the debug information 43.

Thereby, the memory usage can be reduced as compared with a case where all the line information 43a are stored in the memory 1b. Therefore, it is possible to suppress the occurrence of a situation in which the analysis unit 35 cannot analyze the performance of the application program 2 because the debug information 43 cannot be stored in the memory 1b.

An inventor of the present application investigated how much the memory usage can be reduced at the time of analyzing the performance of the application program 2 by the present embodiment. The result is illustrated in FIG. 9A.

Figure 9A:
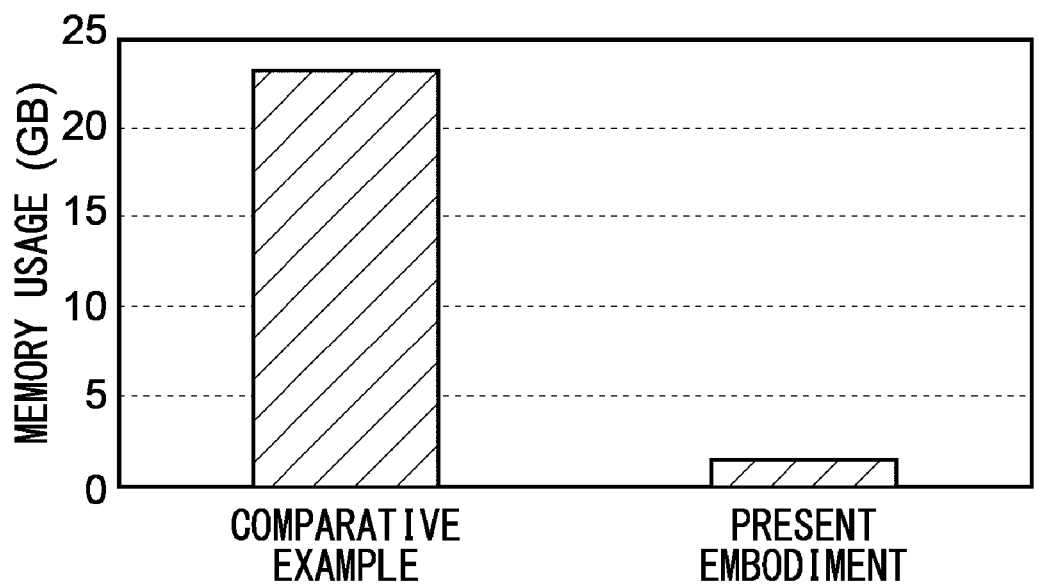
FIG. 9A is a graph obtained by investigating the memory usage during the analysis of the performance of an application program in the present embodiment and a comparative example.

FIG. 9A is a graph obtained by investigating the memory usage during the analysis of the performance of the application program 2 in the present embodiment and a comparative example. The memory usage in the comparative example is a memory usage when all the debug information 43 is stored in the memory 1b.

As illustrated in FIG. 9A, according to the present embodiment, the memory usage can be reduced to about 6% of the memory usage of the comparative example.

Further, if the debug information 43 itself stored in the memory 1b is reduced as in the present embodiment, the amount of processing for the debug information 43 is also reduced, so that the processing time required for the performance analysis of the application program 2 is also considered to be reduced.

Figure 9B:
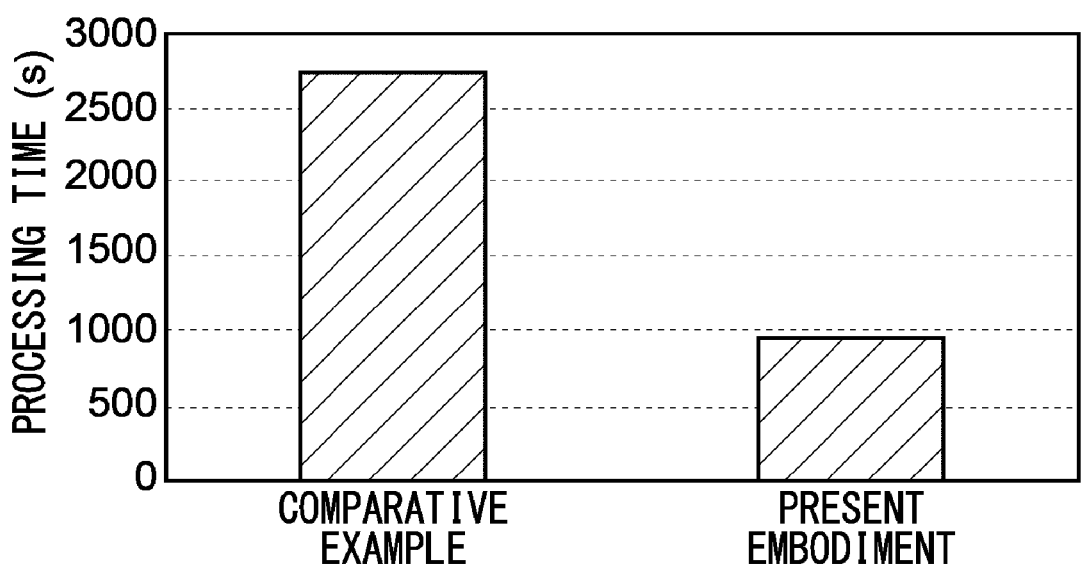
FIG. 9B is a graph obtained by investigating the processing time required to analyze the performance of the application program in each of the present embodiment and the comparative example.

FIG. 9B is a graph obtained by investigating the processing time required to analyze the performance of the application program 2 in each of the present embodiment and the comparative example. As illustrated in FIG. 9B, it is clarified that in the present embodiment, the performance analysis of the application program 2 can be performed in a processing time of about 35% of the comparative example.

Next, consider the case where the function call in the application program 2 is as follows.

main1→hoge2→hoge1

According to this, the application program 2 includes a function main1, a function hoge2 and a function hoge1, the function main1 calls the function hoge2, and the function hoge2 calls the function hoge1. The function hoge1 is an example of a first function, and the function hoge2 is an example of a second function.

In this case, when the instruction address of the function hoge2 is sampled, the rewriting unit 32 preferably rewrites the mark 51 of the symbol 50 corresponding to each of the function main1, the function hoge1 and the function hoge2 from "0" to "1". Thereby, the debug information storage unit 34 stores the line information 43a corresponding to each of the function main1, the function hoge1 and the function hoge2 in the memory 1b. The line information 43a corresponding to the function hoge2 is an example of a third information. Further, the debug information storage unit 34 may store the loop information 43b corresponding to the function hoge2 in the memory 1b. The loop information 43b corresponding to the function hoge2 is an example of a fourth information.

FIG. 10 is a schematic diagram illustrating the name, the instruction address, and the mark of each function.

In FIG. 10, it is assumed that the application program 2 further includes the function main2 and the function hoge3, and the function main2 calls the function hoge3. However, it is assumed that the instruction address of the function hoge3 is not sampled.

In this case, the mark corresponding to each of the function main1, the function hoge1, and the function hoge2 becomes "1" as described above. On the other hand, the mark corresponding to each of the function hoge3 whose instruction address is not sampled and the function main2 which is the caller of the function hoge3 remains "0".

This allows the analysis unit 35 to include the execution time of each of the function main, function hoge1 and function hoge2 whose marks are "1", in the performance information 3, and allows a developer to obtain a decision material for improving the performance of the application program 2. Further, since the line information 43a corresponding to each of the function main2 and the function hoge3 whose marks are "0" is not stored in the memory 1b, the memory usage can be suppressed.

In this example, all the marks of function main1, function hoge2, and function hoge1 are set to "1". However, in some cases, the line information 43a and loop information 4b of the function hoge2 in the middle may not be necessary. This will be explained with reference to FIG. 11.

Figure 11:
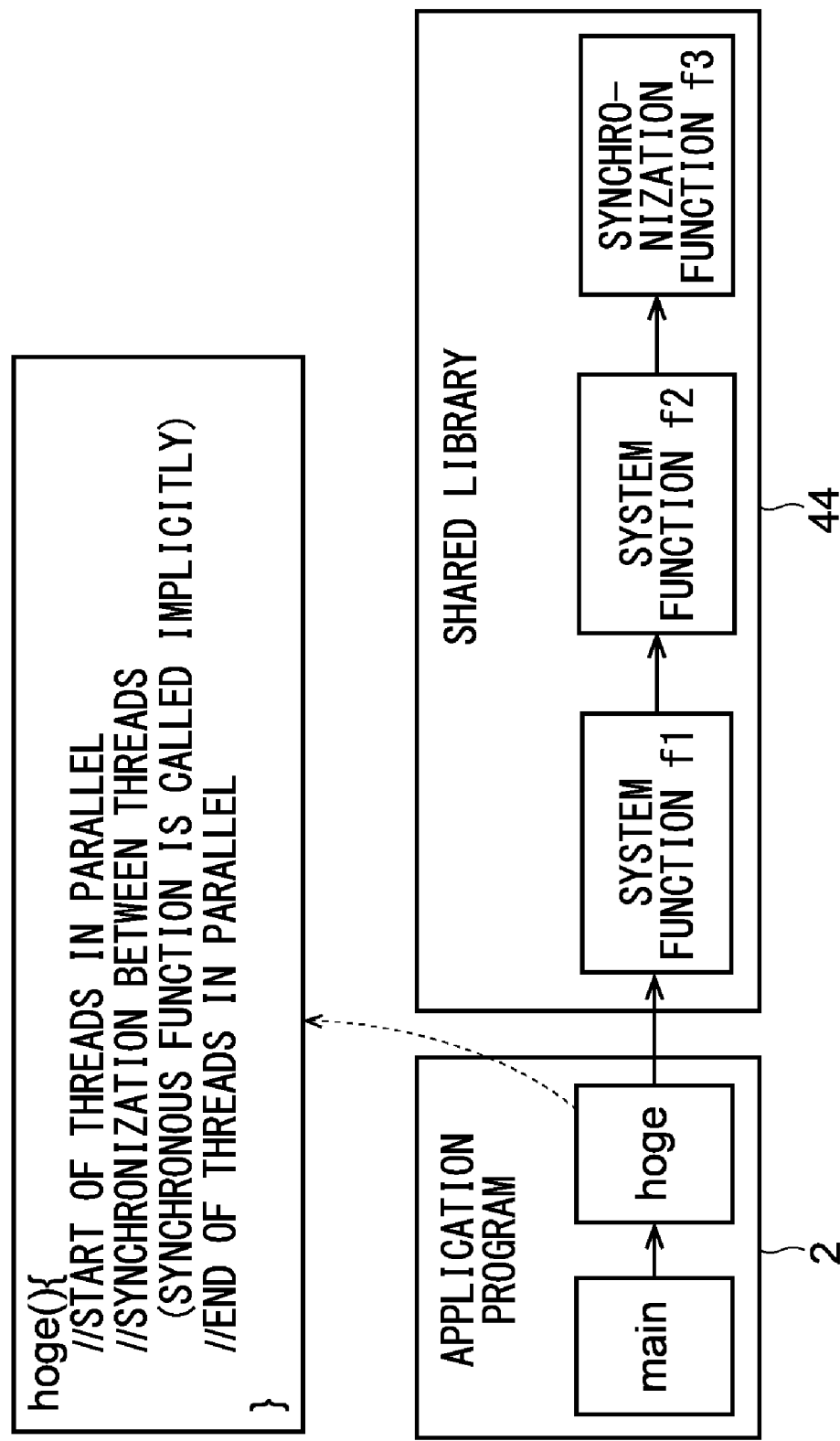
FIG. 11 is a schematic diagram illustrating a case where the line information is not required.

FIG. 11 is a schematic diagram illustrating a case where the line information is not required. In FIG. 11, it is assumed that the application program 2 includes the function main and the function hoge, and the function main calls the function hoge. It is also assumed that the function hoge calls a system function f1, a system function f2, and a synchronization function f3 included in the shared library 44 in this order.

The system functions f1 and f2 are any functions included in the shared library 44. The synchronization function f3 is, for example, a barrier synchronization function of OpenMP. In this example, the function hoge is an example of the first function, and the system functions f1 and f2 are examples of the second function. Also, the synchronization function f3 is an example of a third function.

In this case, when the execution time required for synchronization between threads is calculated, it is sufficient to have the instruction addresses of the function hoge and the synchronization function f3. Therefore, when the instruction address of the synchronous function f3 is sampled, the rewriting unit 32 sets only the mark of each of the synchronous function f3 and the function hoge to "1", and leaves the marks of the system functions f1 and f2 at "0". Thereby, since the line information 43a and the loop information 43b corresponding to the system functions f1 and f2 are not stored in the memory 1b, the memory usage can be saved. The line information 43a corresponding to the system functions f1 and f2 is an example of fifth information.

Next, a situation when the sampling unit 30 samples the instruction address of the function will be described with reference to FIG. 12.

Figure 12:
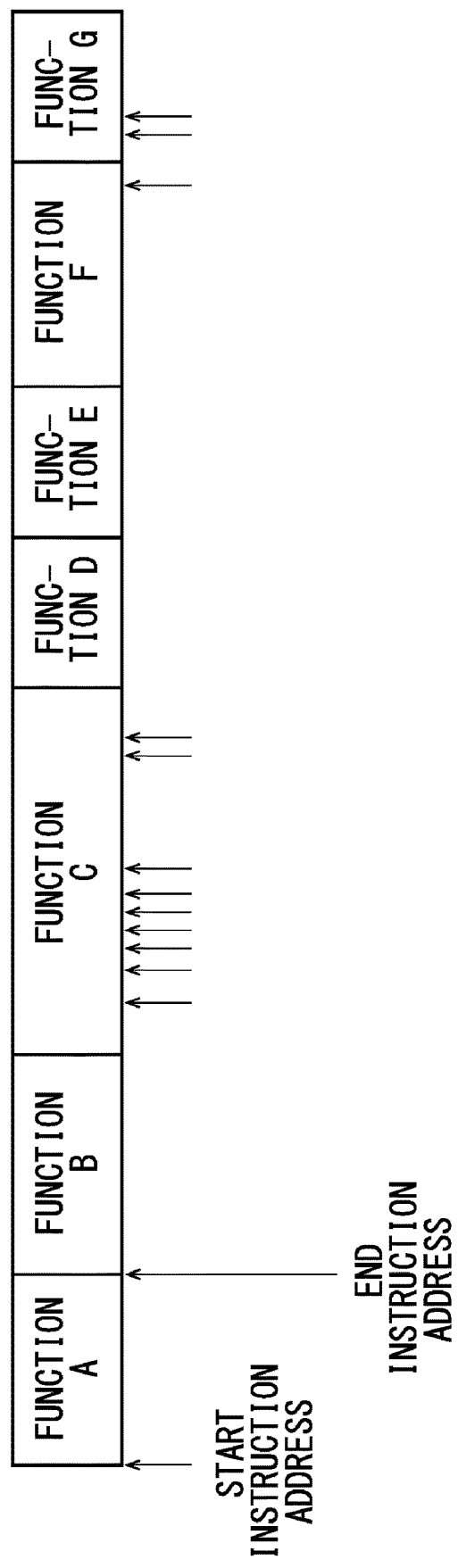
FIG. 12 is a schematic diagram illustrating a situation when a sampling unit samples the instruction address of the function.

FIG. 12 is a schematic diagram illustrating the situation when the sampling unit 30 samples the instruction address of the function.

In FIG. 12, it is assumed that the application program 2 includes functions A to G. It is assumed that the address ranges of the respective functions A to G does not overlap.

If the size of the application program 2 is large, most of the functions in the application program 2 may not be used, and only some of them may be used frequently.

Therefore, as in this example, only the instruction address of function C may be intensively sampled. When instruction addresses other than the instruction address of function C are sampled, the instruction addresses tend to be scattered. For example, the instruction addresses to be sampled are scattered in the respective address ranges of the function F and the function G.

Taking advantage of such characteristics, the performance of the application program 2 may be analyzed as follows.

Figure 13:
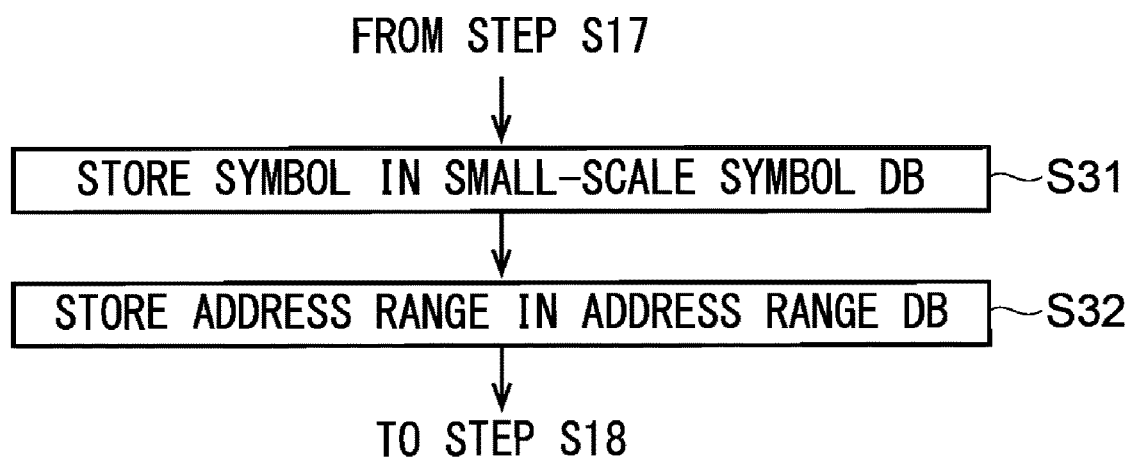
FIG. 13 is a flowchart illustrating an analysis method according to another example of the present embodiment.

FIG. 13 is a flowchart illustrating an analysis method according to another example of the present embodiment.

First, after executing steps S11 to S17 in the same manner as in FIG. 8, the DB control unit 36 adds the symbol 50 of the function identified by the first identification unit 31 in step S17 to a small-scale symbol DB 71 in the memory 1b (step S31).

Figure 14:
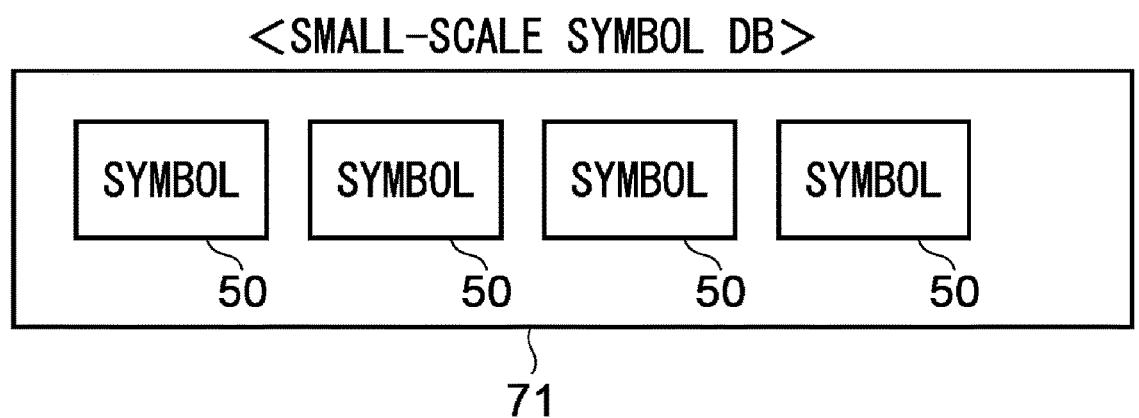
FIG. 14 is a schematic diagram illustrating a small-scale symbol DB.

FIG. 14 is a schematic diagram illustrating the small-scale symbol DB 71.

The small-scale symbol DB 71 is an example of a second database, and is a database including only the symbols 50 corresponding to the function identified in step S17 among the symbols 50 included in the symbol DB 41.

Referring to FIG. 13 again, next, the DB control unit 36 stores the address range of the function identified by the first identification unit 31 in step S17 into an address range DB 72 in the memory 1b (step S32).

FIG. 15 is a schematic diagram illustrating the address range DB 72.

The address range DB 72 is an example of a first database, and is a database including the address range of the function identified by the first identification unit 31.

Referring to FIG. 13 again, after this, steps S18 to S23 are performed in the same manner as in FIG. 8, and the process is completed.

Then, when the analysis device 1 analyzes the performance of the application program 2 from the next time onward, the first identification unit 31 searches for the address range DB 72 in step S17. Next, when the instruction address sampled in step S14 is found to exist in the address range DB 72 by this search, the first identification unit 31 searches for the small-scale symbol DB 71. In the search, the first identification unit 31 identifies the symbol 50 corresponding to the sampled instruction address among the plurality of symbols 50 in the small-scale symbol DB 71. Then, the first identification unit 31 identifies a function including the sampled instruction address in the address range by identifying the function name included in the function information 42 of the identified symbol 50.

According to this, since the number of elements in the small-scale symbol DB 71 is smaller than the number of elements in the symbol DB 41, the search range to be searched by the first identification unit 31 can be narrowed, thereby reducing the search cost.

(Hardware Configuration)

Next, a description will be given of a hardware configuration diagram of the analysis device 1 according to the present embodiment.

Figure 16:
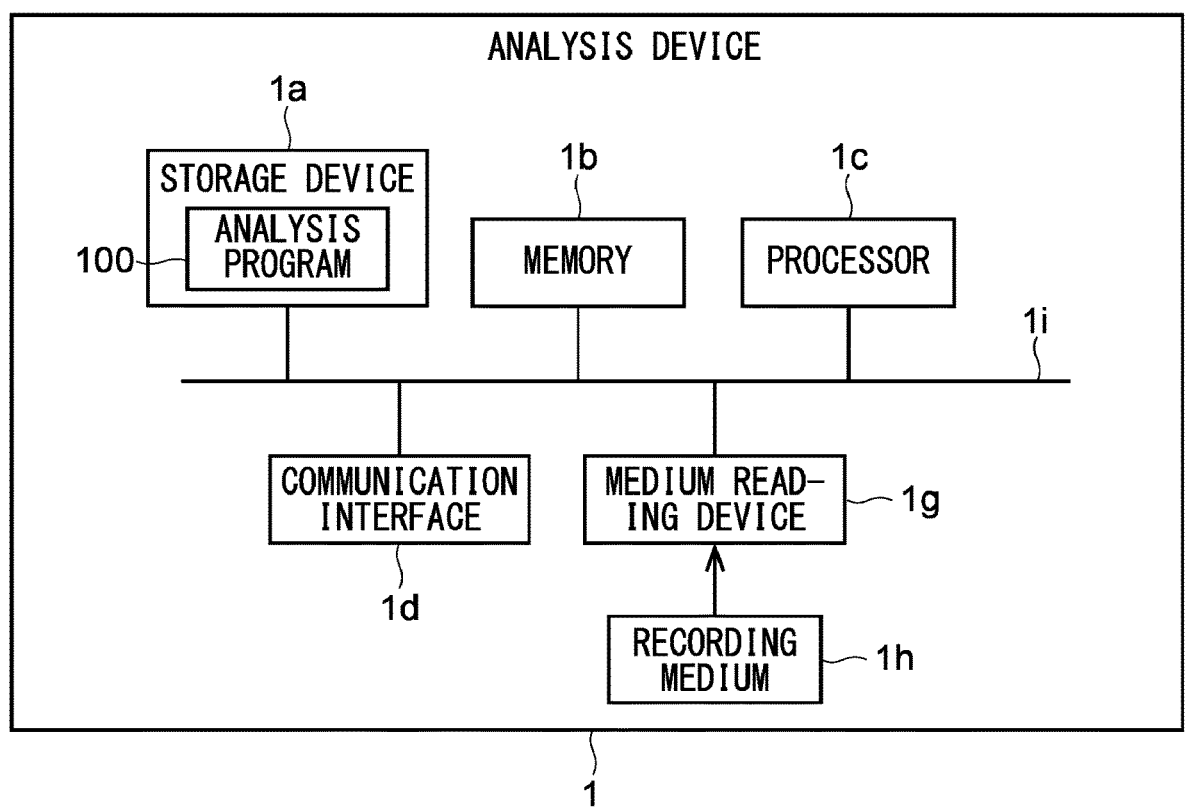
FIG. 16 is a hardware configuration diagram illustrating the analysis device according to the present embodiment.

FIG. 16 is a hardware configuration diagram of the analysis device 1 according to the present embodiment. As illustrated in FIG. 16, the analysis device 1 includes the storage device 1*a*, the memory 1*b*, the processor 1*c*, a communication interface 1*d*, and a medium reading device 1*g*. These elements are connected to each other by a bus 1*i*.

The storage device 1*a* is a non-volatile storage such as an HDD (Hard Disk Drive) or an SSD (Solid State Drive), and stores an analysis program 100 according to the present embodiment.

The analysis program 100 may be recorded on a computer-readable recording medium 1*h*, and the processor 1*c* may be made to read the analysis program 100 through the medium reading device 1*g*.

Examples of such a recording medium 1*h* include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 1*h*. The recording medium 1*h* is not a temporary medium such as a carrier wave having no physical form.

Further, the analysis program 100 may be stored in a device connected to a public line, the Internet, the LAN (Local Area Network), or the like. In this case, the processor 1*c* may read and execute the analysis program 100.

Meanwhile, the memory 1*b* is hardware that temporarily stores data, such as a DRAM (Dynamic Random Access Memory), and the analysis program 100 is developed on the hardware.

The processor 1*c* is hardware such as a CPU (Central Processing Unit) or a GPU (Graphical Processing Unit) that controls each part of the analysis device 1. Further, the processor 1*c* executes the analysis program 100 in cooperation with the memory 1*b*.

In this way, the processor 1*c* and the memory 1*b* work together to execute the analysis program 100, so that the control unit 22 of the analysis device 1 (see FIG. 2) is realized.

The storage unit 23 (see FIG. 2) is realized by the storage device 1*a* and the memory 1*b*.

Further, the communication interface 1*d* is hardware such as a NIC (Network Interface Card) for connecting the analysis device 1 to the network such as the Internet or the LAN (Local Area Network). The communication interface 1*d* realizes the communication unit 21 (see FIG. 2).

The medium reading device 1*g* is hardware such as a CD drive, a DVD drive, and a USB interface for reading the recording medium 1*h*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable recording medium storing an analysis program that causes a computer to execute a process, the process comprising:
    sampling an instruction address of one of a plurality of instructions included in a program during execution of the program;
    identifying a first function that includes the sampled instruction address in an address range;
    rewriting mark information associated with the identified first function;
    identifying first information corresponding to the instruction address of the first function among a plurality of pieces of first information based on the rewritten mark information, the first information being information in which a position and an address range in a source file of the program are associated with each other for each position;
    identifying second information corresponding to the instruction address of the first function among a plurality of pieces of second information based on the rewritten mark information, the second information being information in which a start line, an end line, a start instruction address, and an end instruction address of loop processing in the source file of the program are associated with each other;
    storing the first information and the second information in a memory; and
    analyzing performance of the program based on the first information and the second information stored in the memory.

2. The non-transitory computer-readable recording medium as claimed in claim 1, the process further comprising:
    storing, in the memory, third information corresponding to an address range of the second function, which is a caller of the first function, among the plurality of pieces of first information;
    storing, in the memory, fourth information corresponding to the address range of the second function among the plurality of pieces of second information; and
    analyzing performance of the second function based on the third information and the fourth information stored in the memory.

3. The non-transitory computer-readable recording medium as claimed in claim 2, wherein
    when the first function calls the third function and the third function calls the second function, fifth information corresponding to an address range of the third function among the plurality of pieces of first information is not stored in the memory.

4. The non-transitory computer-readable recording medium as claimed in claim 1, the process further comprising:
    adding the address range of the first function to a first database;
    adding a symbol including the first information corresponding to the first function to a second database; and
    identifying the first information included in the second database when the first information and the second information are included in the first database.

5. The non-transitory computer-readable recording medium as claimed in claim 1, wherein
    the first function is a function obtained by the sampling, and the first information and the second information are included in debug information.

6. An analysis device comprising:

a memory; and a processor coupled to the memory, the processor being configured to:

sample an instruction address of one of a plurality of instructions included in a program during execution of the program;

identify a first function that includes the sampled instruction address in an address range;

rewrite mark information associated with the identified first function;

identify first information corresponding to the instruction address of the first function among a plurality of pieces of first information based on the rewritten mark information, the first information being information in which a position and an address range in a source file of the program are associated with each other for each position;

identify second information corresponding to the instruction address of the first function among a plurality of pieces of second information based on the rewritten mark information, the second information being information in which a start line, an end line, a start instruction address, and an end instruction address of loop processing in the source file of the program are associated with each other;

store the first information and the second information in a memory; and analyze performance of the program based on the first information and the second information stored in the memory.

7. An analysis method for causing a computer to execute a process, the process comprising:

sampling an instruction address of one of a plurality of instructions included in a program during execution of the program;

identifying a first function that includes the sampled instruction address in an address range;

rewriting mark information associated with the identified first function;

identifying first information corresponding to the instruction address of the first function among a plurality of pieces of first information based on the rewritten mark information, the first information being information in which a position and an address range in a source file of the program are associated with each other for each position;

identifying second information corresponding to the instruction address of the first function among a plurality of pieces of second information based on the rewritten mark information, the second information being information in which a start line, an end line, a start instruction address, and an end instruction address of loop processing in the source file of the program are associated with each other;

storing the first information and the second information in a memory; and analyzing performance of the program based on the first information and the second information stored in the memory.

\* \* \* \* \*